US012574266B2

(12) United States Patent
Doshi et al.

(10) Patent No.: US 12,574,266 B2
(45) Date of Patent: Mar. 10, 2026

(54) REFERENCE SIGNAL CONFIGURATION USING A GENERATIVE CHANNEL MODEL

(71) Applicant: QUALCOMM Incorporated, San Diego, CA (US)

(72) Inventors: Akash Sandeep Doshi, San Diego, CA (US); June Namgoong, San Diego, CA (US); Taesang Yoo, San Diego, CA (US); Thomas Markus Hehn, Delft (NL); Tribhuvanesh Orekondy, Biel (CH)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/478,908

(22) Filed: Sep. 29, 2023

(65) Prior Publication Data

US 2025/0112804 A1 Apr. 3, 2025

(51) Int. Cl.
| | |
|---|---|
| H04L 25/02 | (2006.01) |
| H04L 5/00 | (2006.01) |
| H04W 72/1273 | (2023.01) |

(52) U.S. Cl.
CPC ........ H04L 25/0204 (2013.01); H04L 5/0048 (2013.01); H04L 25/0224 (2013.01); H04W 72/1273 (2013.01)

(58) Field of Classification Search
CPC ............... H04L 5/0048; H04L 25/0204; H04L 25/0224; H04W 72/1273
See application file for complete search history.

(56) References Cited

U.S. PATENT DOCUMENTS

| | | | | |
|---|---|---|---|---|
| 2021/0326701 | A1 * | 10/2021 | Bai | G06N 3/084 |
| 2022/0085935 | A1 * | 3/2022 | Pezeshki | H04W 72/21 |
| 2022/0188440 | A1 * | 6/2022 | DeLuca | G06F 30/10 |
| 2023/0085270 | A1 * | 3/2023 | Zirwas | H04L 25/0254 |
| | | | | 370/252 |
| 2024/0275641 | A1 * | 8/2024 | Shojaeifard | H04L 5/0085 |
| 2025/0047346 | A1 * | 2/2025 | Timo | H04L 5/0057 |
| 2025/0080256 | A1 * | 3/2025 | Li | H04B 17/336 |

FOREIGN PATENT DOCUMENTS

| | | | | |
|---|---|---|---|---|
| WO | WO-2023147687 | A1 * | 8/2023 | H04B 17/328 |

* cited by examiner

*Primary Examiner* — David B Lugo

(74) *Attorney, Agent, or Firm* — Harrity & Harrity, LLP

(57) ABSTRACT

Various aspects of the present disclosure generally relate to wireless communication. In some aspects, a user equipment (UE) may receive a generative channel model (GCM) that outputs channel information pertaining to a digital twin (DT). The UE may receive a configuration of a downlink reference signal. The UE may perform channel estimation using the configuration of the downlink reference signal. The UE may transmit a report, wherein the report includes a precoding indicator, and wherein at least one of computation of the precoding indicator, or a channel estimation algorithm for the channel estimation, uses the GCM. Numerous other aspects are described.

30 Claims, 10 Drawing Sheets

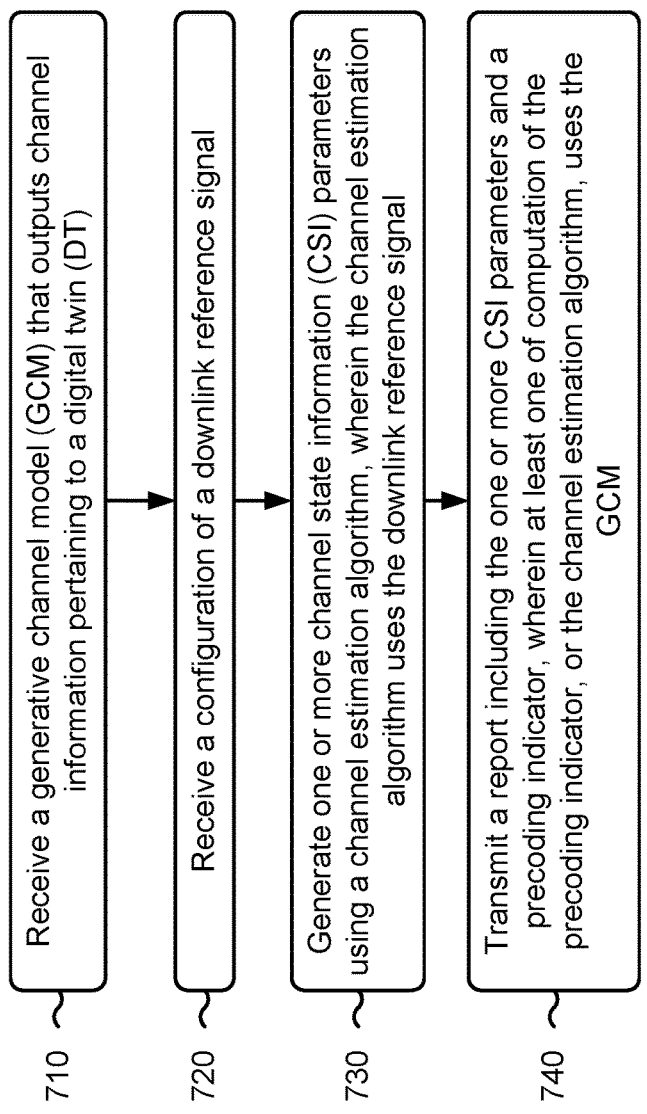

710 Receive a generative channel model (GCM) that outputs channel information pertaining to a digital twin (DT)

720 Receive a configuration of a downlink reference signal

730 Generate one or more channel state information (CSI) parameters using a channel estimation algorithm, wherein the channel estimation algorithm uses the downlink reference signal 740 Transmit a report including the one or more CSI parameters and a precoding indicator, wherein at least one of computation of the precoding indicator, or the channel estimation algorithm, uses the GCM

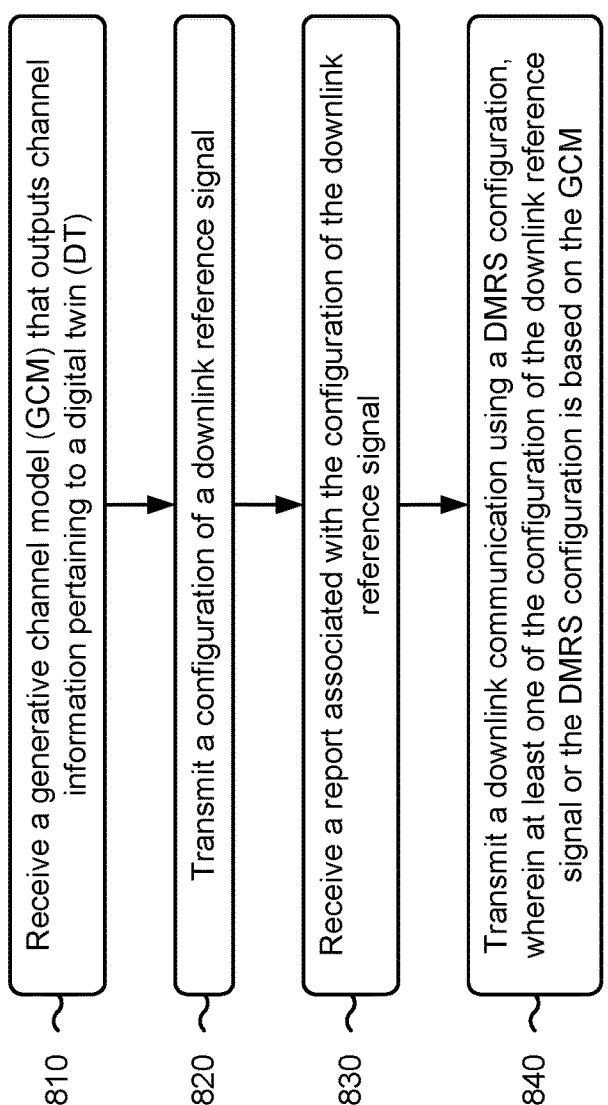

810 — Receive a generative channel model (GCM) that outputs channel information pertaining to a digital twin (DT)

820 — Transmit a configuration of a downlink reference signal

830 — Receive a report associated with the configuration of the downlink reference signal 840 — Transmit a downlink communication using a DMRS configuration, wherein at least one of the configuration of the downlink reference signal or the DMRS configuration is based on the GCM

REFERENCE SIGNAL CONFIGURATION USING A GENERATIVE CHANNEL MODEL

FIELD OF THE DISCLOSURE

Aspects of the present disclosure generally relate to wireless communication and to techniques and apparatuses for reference signal configuration using a generative channel model.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a generative channel model (GCM) that outputs channel information pertaining to a digital twin (DT); receiving a configuration of a downlink reference signal; generating one or more channel state information (CSI) parameters using a channel estimation algorithm, wherein the channel estimation algorithm uses the downlink reference signal; and transmitting a report including the one or more CSI parameters and a precoding indicator, wherein at least one of computation of the precoding indicator, or the channel estimation algorithm, uses the GCM.

In some aspects, a method of wireless communication performed by a network node includes receiving a GCM that outputs channel information pertaining to a DT; transmitting a configuration of a downlink reference signal; receiving a report associated with the configuration of the downlink reference signal; and transmitting a downlink communication using a demodulation reference signal (DMRS) configuration, wherein at least one of the configuration of the downlink reference signal or the DMRS configuration is based on the GCM.

In some aspects, an apparatus for wireless communication at a UE includes one or more memories; and one or more processors, coupled to the one or more memories, configured to cause the UE to: receive a generative channel model (GCM) that outputs channel information pertaining to a digital twin (DT); receive a configuration of a downlink reference signal; generate one or more channel state information (CSI) parameters using a channel estimation algorithm, wherein the channel estimation algorithm uses the downlink reference signal; and transmit a report including the one or more CSI parameters and a precoding indicator, wherein at least one of computation of the precoding indicator, or the channel estimation algorithm, uses the GCM.

In some aspects, an apparatus for wireless communication at a network node includes one or more memories; and one or more processors, coupled to the one or more memories, configured to cause the network node to: receive a GCM that outputs channel information pertaining to a DT; transmit a configuration of a downlink reference signal; receive a report associated with the configuration of the downlink reference signal; and transmit a downlink communication using a DMRS configuration, wherein at least one of the configuration of the downlink reference signal or the DMRS configuration is based on the GCM.

In some aspects, a non-transitory computer-readable medium storing a set of instructions for wireless communication includes one or more instructions that, when executed by one or more processors of a UE, cause the UE to: receive a generative channel model (GCM) that outputs channel information pertaining to a digital twin (DT); receive a configuration of a downlink reference signal; generate one or more channel state information (CSI) parameters using a channel estimation algorithm, wherein the channel estimation algorithm uses the downlink reference signal; and transmit a report including the one or more CSI parameters and a precoding indicator, wherein at least one of computation of the precoding indicator, or the channel estimation algorithm, uses the GCM.

In some aspects, a non-transitory computer-readable medium storing a set of instructions for wireless communication includes one or more instructions that, when executed by one or more processors of a network node, cause the network node to: receive a GCM that outputs channel information pertaining to a DT; transmit a configuration of a downlink reference signal; receive a report associated with the configuration of the downlink reference signal; and transmit a downlink communication using a DMRS configuration, wherein at least one of the configuration of the downlink reference signal or the DMRS configuration is based on the GCM.

In some aspects, an apparatus for wireless communication includes means for receiving a generative channel model (GCM) that outputs channel information pertaining to a digital twin (DT); means for receiving a configuration of a downlink reference signal; means for generating one or more channel state information (CSI) parameters using a channel estimation algorithm, wherein the channel estimation algorithm uses the downlink reference signal; and means for transmitting a report including the one or more CSI parameters and a precoding indicator, wherein at least one of computation of the precoding indicator, or the channel estimation algorithm, uses the GCM.

In some aspects, an apparatus for wireless communication includes means for receiving a GCM that outputs channel information pertaining to a DT; means for transmitting a configuration of a downlink reference signal; means for receiving a report associated with the configuration of the downlink reference signal; and means for transmitting a downlink communication using a DMRS configuration, wherein at least one of the configuration of the downlink reference signal or the DMRS configuration is based on the GCM.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, at a UE or an apparatus of a UE, in accordance with the present disclosure.

FIG. 8 is a diagram illustrating an example process performed, for example, at a network node or an apparatus of a network node, in accordance with the present disclosure.

DETAILED DESCRIPTION

Figure 1:
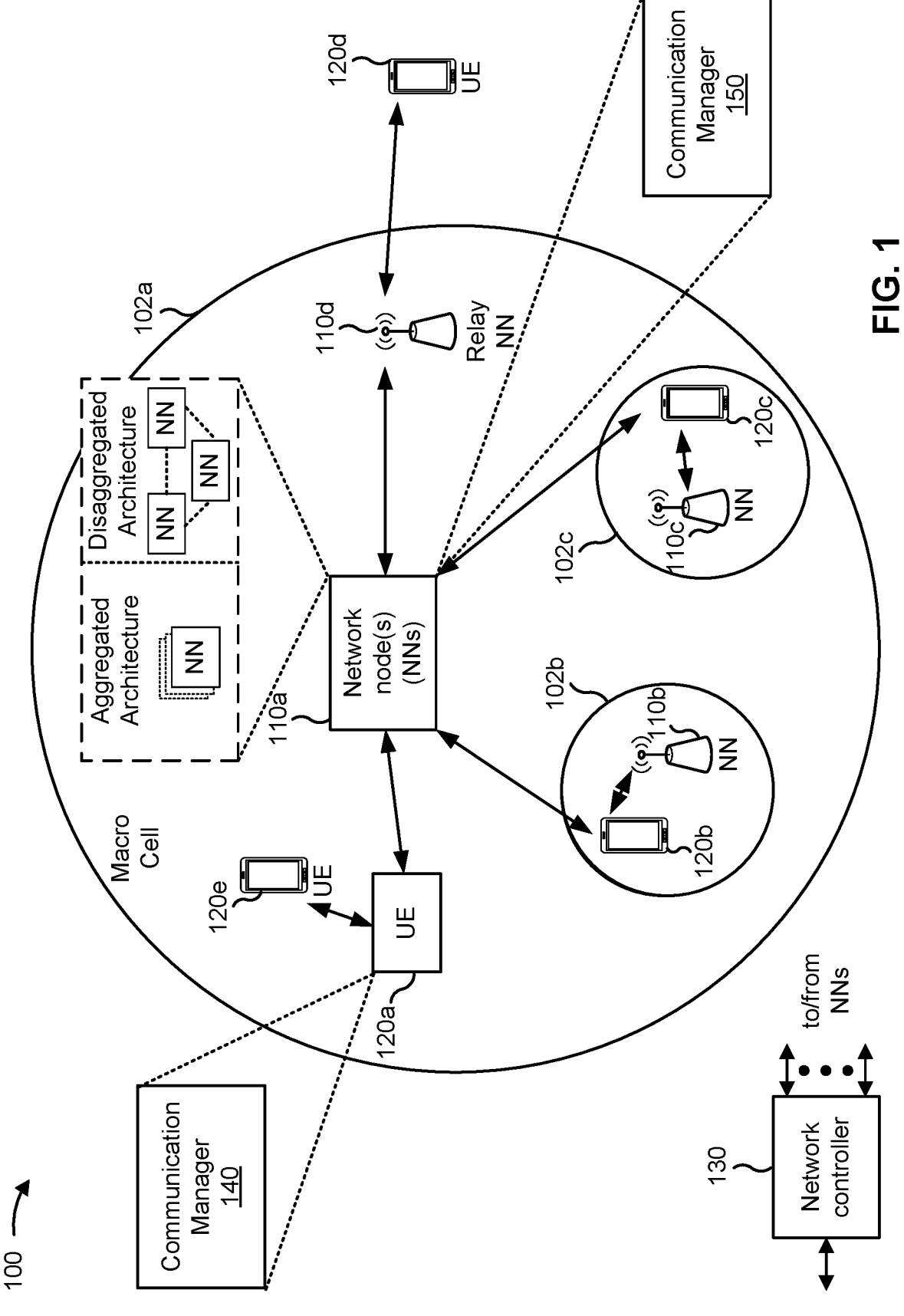
FIG. 1 is a diagram illustrating an example of a wireless network, in accordance with the present disclosure.

Communication in a wireless network may benefit from knowledge of the environmental characteristics that define how signals propagate between wireless communication devices. These signals may be referred to as propagating via a "channel," which, in this context, refers to the medium between the wireless communication devices. The channel can proceed directly from a transmitter to a receiver and/or can proceed via one or more reflectors or obstructions. In some examples, the channel can include multiple paths taken by a signal, transmitted by a single transmitter, to reach a single receiver. The channel is also affected by the properties of the medium itself or of interaction of the signal with the medium, such as attenuation of a signal as it travels via the medium or material properties of reflectors or obstructions in the channel.

Properties of the channel may be obtained by estimating the channel, such as using a channel estimation algorithm. A channel estimation algorithm may generally receive inputs regarding the channel, such as a measurement of a reference signal that propagated via the channel, and may output information characterizing the channel, such as a channel matrix or information derived from the channel matrix. In some aspects, the information may include channel state information (CSI). This information can then be used to configure communications to better suit the channel, such as by selecting a number of layers (e.g., data streams) that the channel can support or configuration a modulation scheme and/or code rate to provide acceptable performance over the channel. The reference signal may be configured for the measuring device, such that the measuring device can properly obtain the channel matrix by measuring the reference signal. Examples of reference signals include CSI reference signals (CSI-RSs) and demodulation reference signals (DMRSs).

The above channel estimation may provide useful information regarding a channel in which wireless communication devices are deployed, and may facilitate adjustment of communication parameters in the course of communication. However, there are some up-front measurement and configuration time involved for a wireless communication device to estimate the channel and establish suitable communication parameters. It may be beneficial to facilitate prediction of the information regarding the channel, such as before wireless communication devices are deployed in the channel or for a first set of conditions (e.g., a first time of day or a first level of congestion) given a second set of conditions (e.g., a second time of day or a second level of congestion).

A digital twin is an information set including information regarding a network deployment and properties associated with the network deployment. For example, a digital twin may be representative of an area, such as a cell, a sub-cell (e.g., a part of a cell, a subset of a coverage area of a cell), an environment, or the like. A sub-cell may be referred to herein as a part of a cell. A digital twin may include a representation of one or more radio emitters (such as a location of a radio emitter, a physical configuration of the radio emitter, and/or a radio configuration of the radio emitter), one or more objects (such as geometry of the one or more objects and/or physical properties of the one or more objects, including reflection or absorption properties), a geographical layout, a channel (such as propagation properties of the channel, including signal attenuation), or the like. For example, a digital twin may represent a full lifecycle of a physical network process, such as using a physical model, sensor information, operational history, and/or other data. A digital twin may be consistent with physical network elements and topology of a cell or sub-cell represented by the digital twin. A digital twin can be used in conjunction with a channel model, such as a generative channel model (GCM), to model network performance in an area represented by the digital twin.

A channel model is a model that receives, as input, observations or measurements regarding a channel or environment, and outputs channel information regarding the channel or environment. Examples of channel models include a tapped delay line (TDL) model (in which each tap of a channel is modeled with different delays via random variables) and a clustered delay line (CDL) model (in which taps are replaced by clusters to capture spatial characteristics of a channel). TDL models and CDL models may be useful for rapid benchmarking, but may rely on certain abstractions and simplifications, reducing the accuracy of a field data distribution output by such models. Furthermore, TDL models and CDL models may rely on fitting parameters of the model to measured data, which is cumbersome and provides limited adaptability and predictive power.

Another form of channel model is a GCM. A GCM is a channel model trained using a machine learning algorithm, such as a generative modeling algorithm (e.g., which may generate a generative adversarial network model). Generative modeling is a machine learning task (e.g., an unsupervised learning task) that may involve automatically discovering and learning the regularities or patterns in input data in such a way that the model can be used to generate or output new examples that plausibly could have been drawn from the original dataset. A GCM may model a distribution of channel taps. For example, a model of a multi-path channel may include a delay line with several channel taps. A channel tap may be a point on the delay line corresponding to a certain delay. The signals from each tap can then be "summed" and the composite signal from this summing may represent a simulation of a radio wave as received by a receiver and when subject to fading on the multi-path channel. A GCM may learn a distribution of a channel impulse response (CIR) based on transmit and receive signal pairs, and may model the distribution of channel taps according to this distribution. A GCM may implicitly learn (e.g., model) a distribution of stochastic channel effects using a generative model. The GCM may output a filtered signal, where the filtered signal is subject to sampled instances of channel response filters defined by and sampled from the GCM. A GCM may provide compatibility with parallel computation, which is particularly beneficial for multiple-input multiple-output (MIMO) and multipath channels. Furthermore, a GCM may be differentiable, which enables use of GCMs in end-to-end designs of communication systems in which back-propagation through the channel may be desirable. Since the channel filter is stochastically generated independent of the input signal, the GCM may be invariant to certain input-encoding factors, such as the duration of the input waveform. Notably, a GCM associated with a DT may provide benefits over some forms of neural network channel modeling. For example, some other forms of neural network channel model may be trained using field measurements of a channel. A GCM associated with a DT can output a number of different channel realizations for a given location in the DT depending on the random seed input to the GCM. Consequently, a neural network trained using channel realizations output by the GCM would be less prone to overfitting and more generalizable than a neural network that is directly trained using field channel measurements.

A GCM can be employed with a digital twin. For example, a GCM may receive a digital twin or information extracted from the digital twin as input (e.g., in addition to a seed value). The GCM may output channel information specific to the digital twin, which may be considered site-specific propagation channels corresponding to the digital twin or an area represented by the digital twin. By sampling (e.g., outputting) site-specific propagation channels for various locations represented by the digital twin, signal propagation and other properties for a cell or sub-cell can be modeled.

As mentioned, channel estimation may include measurement of a reference signal and application of a channel estimation algorithm to the measurement. The reference signal can use various configurations, such as different distributions in frequency or in time, as described with regard to FIG. 4. The reference signal may use some amount of overhead. Furthermore, there are situations in which a given reference signal configuration provides limited additional information over another reference signal configuration. Thus, there may be a benefit to configuring a reference signal in view of channel conditions in a given area, such that a balance can be reached between overhead and richness of information extracted from the reference signal. However, some areas may be sparsely measured or channel conditions may change rapidly. Furthermore, there may be some delay in reconfiguring a downlink reference signal according to historical measurements due to the time involved in obtaining and reporting such measurements, thereby reducing the efficiency of downlink reference signal transmission and optimization.

Also, a user equipment (UE) may receive a communication using a DMRS. For example, the UE may demodulate the communication using the DMRS. The DMRS may be associated with a DMRS configuration that defines a frequency-domain density or code density. These densities may be based on feedback regarding channel estimation, such as CSI. However, different parts of a cell may support different DMRS configurations. For example, a first part of a cell may have less frequency selectivity (indicating lower channel variability in the frequency domain at a given time) than a second part of the cell, meaning that a higher frequency-domain density can be used in the first part of the cell than in the second part of the cell. Again, there may be some delay in reconfiguring a DMRS according to historical measurements due to the time involved in obtaining and reporting such measurements, thereby reducing the efficiency of downlink reference signal transmission and optimization particularly where the optimal DMRS configuration may vary in different parts of a cell.

Aspects of the present disclosure relate generally to machine-learning-based channel modeling. Some aspects more specifically relate to modeling using a digital twin (DT) and a GCM. In some aspects, a UE and network node may receive a GCM that outputs channel information pertaining to a DT, such as a particular DT. In some aspects, the network node may signal information indicating the DT and/or the GCM to the UE. The network node may transmit, and the UE may receive, a configuration of a downlink reference signal such as a CSI-RS. In some aspects, the configuration of the downlink reference signal may be based on the GCM and/or the DT. The UE may perform channel estimation using the configuration of the downlink reference signal. In some aspects, a channel estimation algorithm for the channel estimation uses the GCM. For example, the channel estimation algorithm may receive, as input, the channel information output by the GCM. The UE may transmit, and the network node may receive, a report including a precoding indicator. In some aspects, computation of the precoding indicator is based on the GCM. In some aspects, the network node may transmit a downlink communication using a DMRS configuration and/or a precoder indicated by the precoding indicator. For example, the DMRS configuration (e.g., a frequency-domain density of the DMRS configuration or a number of layers associated with the DMRS configuration) may be associated with a frequency selectivity of the channel information.

Aspects of the present disclosure may be used to realize one or more of the following potential advantages. In some aspects, by receiving the GCM that outputs channel information pertaining to a DT and/or by signaling information indicating the DT and/or the GCM to the UE, a common understanding of the DT and GCM to be used for channel modeling can be achieved at the network node and the UE, thereby facilitating use of different DTs for different scenarios and enabling optimization using DTs and GCMs at both the UE and the network node. In some aspects, by configuring the downlink reference signal, such as the CSI-RS, based on the GCM and/or the DT, the network node improves a balance between overhead and richness of channel estimation, particularly for different parts of an area represented by the DT. This also enables optimization of the CSI-RS in scenarios with sparse channel estimation or no channel estimation, such as when a UE is first deployed in an area. In some aspects, by performing channel estimation using the GCM, accuracy of the channel estimation is improved and channel estimation using sparser reference signaling is enabled, thereby reducing overhead. In some aspects, by configuring the DMRS configuration (e.g., a frequency-domain density of the DMRS configuration or a number of layers associated with the DMRS configuration) based on the GCM, DMRS frequency-domain density can be optimized in different scenarios and different parts of a coverage area of a cell or sub-cell, particularly in scenarios involving sparse channel estimation or no channel estimation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a GCM that outputs channel information pertaining to a DT; receive a configuration of a downlink reference signal; perform channel estimation using the configuration of the downlink reference signal; and transmit a report, wherein the report includes a precoding indicator, and wherein at least one of computation of the precoding indicator, or a channel estimation algorithm for the channel estimation, uses the GCM. Additionally, or alternatively, the communication manager 140 may perform one or more other operations described herein.

In some aspects, the network node 110 may include a communication manager 150. As described in more detail elsewhere herein, the communication manager 150 may receive a GCM that outputs channel information pertaining to a DT; transmit a configuration of a downlink reference signal; receive a report associated with the configuration of the downlink reference signal; and transmit a downlink communication using a DMRS configuration, wherein at least one of the configuration of the downlink reference signal or the DMRS configuration is based on the GCM. Additionally, or alternatively, the communication manager 150 may perform one or more other operations described herein.

As indicated above, FIG. 1 is provided as an example. Other examples may differ from what is described with regard to FIG. 1.

Figure 2:
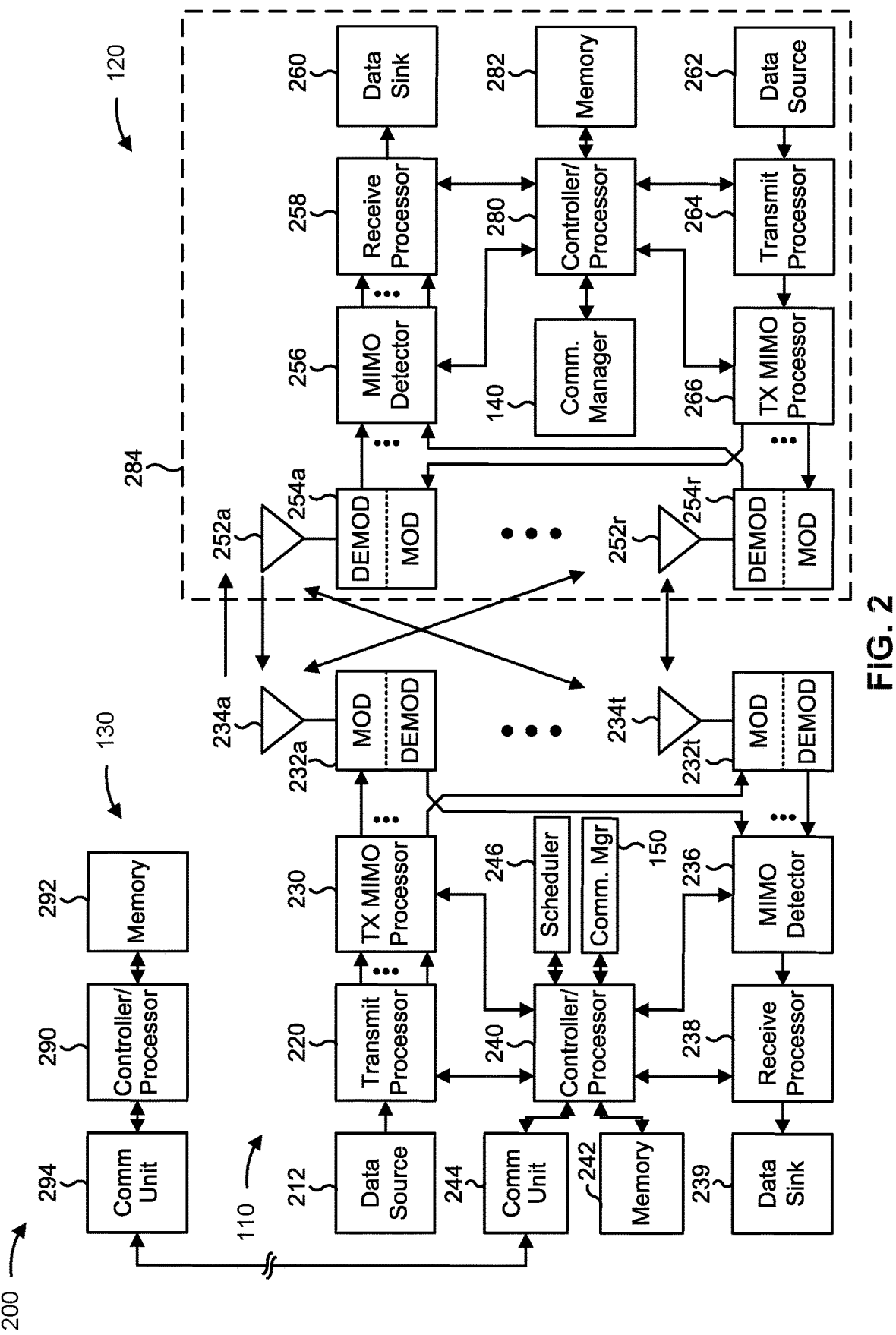
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with channel modeling, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120. respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a GCM that outputs channel information pertaining to a digital twin; means for receiving a configuration of a downlink reference signal; means for performing channel estimation using the configuration of the downlink reference signal; and/or means for transmitting a report, wherein the report includes a precoding indicator, and wherein at least one of computation of the precoding indicator, or a channel estimation algorithm for the channel estimation, uses the GCM. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving a GCM that outputs channel information pertaining to a DT; means for transmitting a configuration of a downlink reference signal; means for receiving a report associated with the configuration of the downlink reference signal; and/or means for transmitting a downlink communication using a DMRS configuration, wherein at least one of the configuration of the downlink reference signal or the DMRS configuration is based on the GCM. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
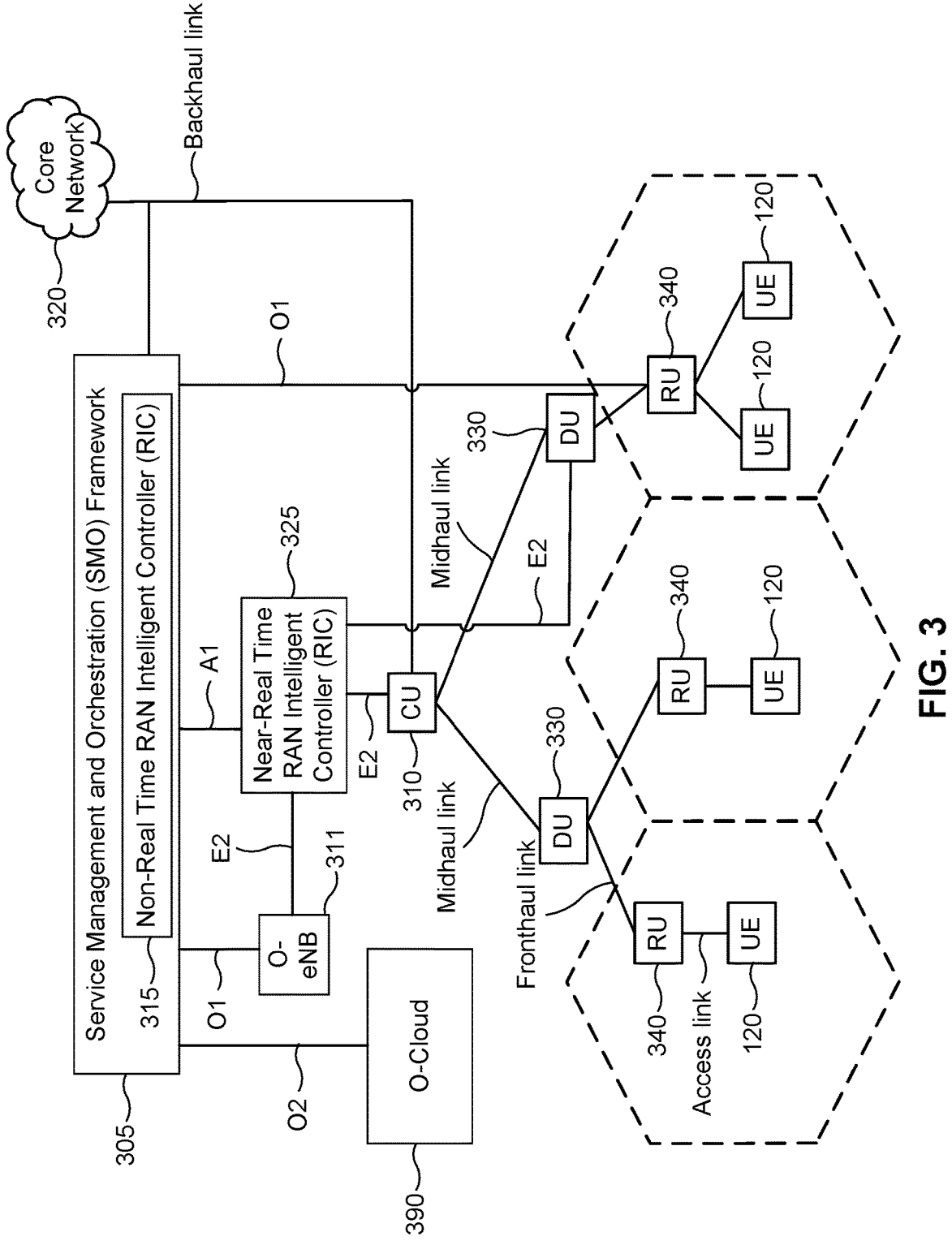
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a frame structure, FIG. 4B is a diagram 430 illustrating an example of DL channels within a subframe, FIG. 4C is a diagram 450 illustrating an example of a second subframe within a frame structure, and FIG. 4D is a diagram 480 illustrating an example of UL channels within a subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL and UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu} \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the physical uplink control channel (PUCCH) and DMRSs for the physical uplink shared channel (PUSCH). The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. For example, a DMRS may have a DMRS configuration that indicates a frequency-domain density of the DMRS. A frequency-domain density supporting two layers or data streams is shown in FIG. 4A by the inclusion of $R_0$ and $R_1$ on the DMRSs. Other frequency-domain densities can support four layers or data streams (e.g., including $R_0$, $R_1$, $R_2$, and $R_3$), one data stream (e.g., including only $R_0$ or R), or a different number of data streams. Thus, the DMRS configuration can indicate one or more of the number of data streams/layers of a downlink communication or a frequency-domain density of the DMRS itself.

UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a CQI, a precoding matrix indicator (PMI), a rank indicator (RI), and hybrid automatic repeat request (HARQ) acknowledgment (ACK) or negative ACK (NACK) feedback. The PUSCH carries data, and may additionally be used to carry a buffer status report (BSR), a power headroom report (PHR), and/or UCI.

As indicated above, FIGS. 4A-4D are provided as examples. Other examples may differ from what is described with regard to FIGS. 4A-4D.

Figure 5:
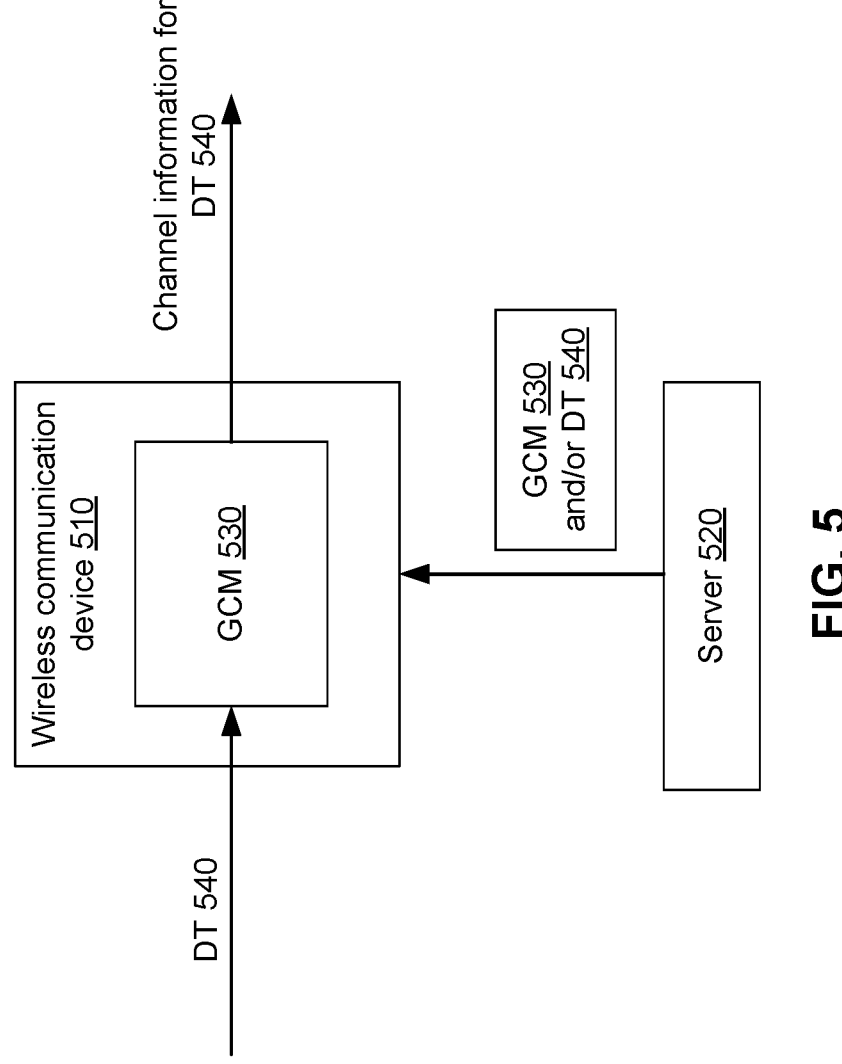
FIG. 5 is a diagram illustrating an example of generating channel information using a generative channel model (GCM), in accordance with the present disclosure.

FIG. 5 is a diagram illustrating an example 500 of generating channel information using a GCM, in accordance with the present disclosure. Example 500 includes a wireless communication device 510, which may include a UE 120 or a network node 110. Example 500 also includes a server 520. The server 520 may include, for example, network node 110, Non-RT RIC 315, Near-RT RIC 325, or the like.

As shown, the server 520 may provide, to the wireless communication device 510, a GCM 530 and/or a DT 540. For example, the wireless communication device 510 may request the GCM 530 and/or the DT 540 using an identifier associated with the GCM 530 and/or the DT 540. In some aspects, the server 520 may provide the GCM 530 and/or the DT 540 using location information. For example, the server 520 may provide a GCM 530 and/or a DT 540 that is pertinent to a location of the wireless communication device 510, such as a DT 540 for a cell or sub-cell in which a UE is located or a DT 540 for a cell or sub-cell provided by a network node. Thus, the cell or sub-cell may correspond to the DT 540, since the DT 540 includes a representation of the cell or sub-cell. In some aspects, the server 520 may provide the GCM 530 and/or the DT 540 to a UE and to a network node, as described elsewhere herein. A sub-cell may include a part of a cell, such as a geographical region of the cell, a particular beam, a group of UEs, or the like.

In some aspects, the server 520 may provide multiple GCMs 530 and/or DTs 540. For example, each of a set of GCMs 530 for a cell site (e.g., for each cell site) may be assigned an identifier. In some aspects, the identifier may identify a GCM 530 and a DT 540. For a given cell site, such as a given gNB or network node 110, there may be multiple DTs 540 and/or GCMs 530 (e.g., depending on a time of day, a season, a day of the week, or the like). For example, a first GCM 530 and DT 540 may be used in a first time window, and a second GCM 530 and DT 540 may be used in a second time window.

As shown, the GCM 530 may receive, as input, a corresponding DT 540. For example, the GCM 530 may receive the DT 540 and a seed (e.g., a random value or the like). As further shown, the GCM 530 may output channel information (e.g., channel information pertaining to the DT 540). As used herein, a GCM 530 outputting channel information can include outputting a representation of a channel and/or filtering a signal according to channel filters generated by the GCM 530. For example, the channel information may include the filtered signal, or information derived from the filtered signal. The channel information may pertain to the DT 540 in that the channel information is generated by the GCM 530 using the DT 540 (or information extracted from the DT 540) as an input.

Figure 6:
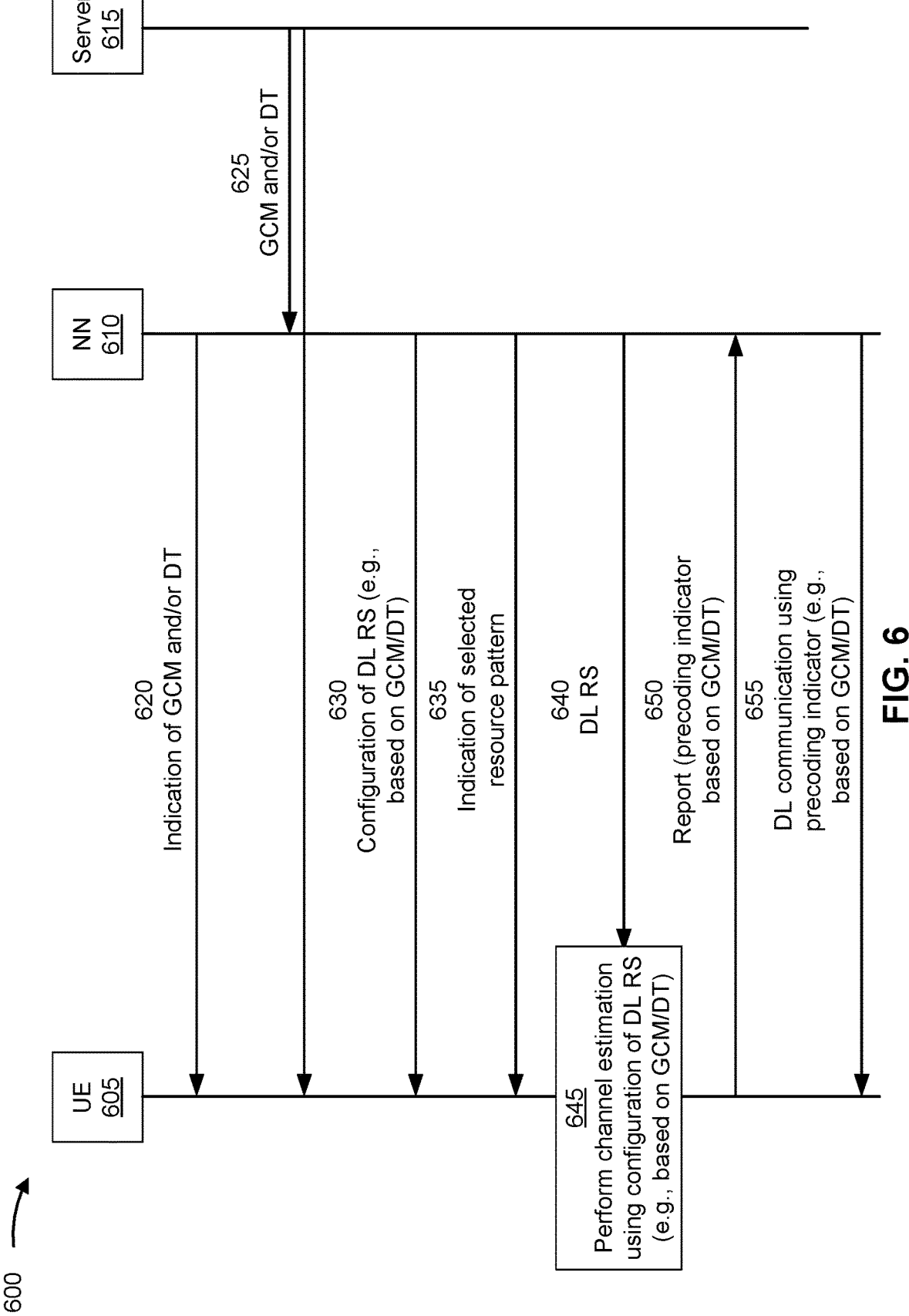
FIG. 6 is a diagram illustrating an example of signaling for reference signal (RS) configuration using a GCM and a digital twin (DT), in accordance with the present disclosure.

Signaling to support usage of the GCM 530 at the wireless communication device 510 (such as the UE 120 and the network node 110) is described with regard to FIG. 6.

FIG. 6 is a diagram illustrating an example 600 of signaling for RS configuration using a GCM and a DT, in accordance with the present disclosure. Example 600 includes a UE 605 (e.g., UE 120, wireless communication device 510), a network node 610 (e.g., network node 110, wireless communication device 510, server 520), and a server 615 (e.g., server 520). In some aspects, the server 615 may be co-located with or may be the network node 610.

With a DT (e.g., DT 540) and a GCM (e.g., GCM 530) optimized for each cell, site-specific propagation channels can be sampled for each location within a given cell. With such a prior on the channel distribution, a downlink reference signal, such as a CSI-RS or a DMRS, may be optimized in a cell/sub-cell specific manner. For example, a frequency and/or temporal density can be chosen for reduced DMRS overhead while achieving robust performance. To perform site-specific downlink reference optimization, one may consider channel estimation (CHEST) accuracy and/or noise estimation (NEST) accuracy (e.g., estimation of noise covariance and/or derivation of an $R_{nn}$ matrix which may be used for minimum mean squared error computation), and data dimension loss due to reference signal overhead maintaining achievable throughput loss (e.g., given on the link condition due to channel condition, noise, and interference, there may be an optimal amount of channel estimation and accuracy to achieve the highest throughput). The DT+GCM based reference signal optimization may be impacted by similar factors, such as a propagation channel given by the nature alone (that is, a propagation channel without precoding, beamforming, or an antenna array pattern), beamforming or precoding applied to the virtual antenna ports, interference and noise, and the employed CHEST/NEST algorithm. Example 600 provides for a gNB (e.g., network node 610) and a UE 605 to download a shared (e.g., the same) model of a DT (e.g., DT 540) and a GCM (e.g., GCM 530) from the server 615. The gNB may perform DT+GCM aided downlink reference signal optimization. The UE 605 may perform DT+GCM aided downlink channel estimation of the received downlink reference signal.

As shown by reference number 620, the network node 610 may transmit, and the UE 605 may receive, an indication of a GCM (e.g., GCM 530). For example, the indication may indicate the GCM, a DT (e.g., DT 540) associated with the GCM, or a combination thereof. In some aspects, the indication may include an identifier of the GCM and/or the DT. In some aspects, the indication may be included in an RRC message. Additionally, or alternatively, the indication may be included in a system information message such as an SIB.

In some aspects, the network node 610 may select the GCM and/or the DT. For example, the network node 610 may select the GCM and/or the DT based on one or more parameters, such as a time of day, a location of a cell, a mapping between the cell and the GCM/DT, a congestion level, a day of the week, a frequency range, or the like.

As shown by reference number 625, the network node 610 and the UE 605 may receive the GCM and/or the DT from the server 615. For example, the network node 610 may receive the GCM and/or the DT from the server 615, and may provide the GCM and/or the DT to the UE 605 (such as via RRC signaling). As another example, the UE 605 may obtain the GCM and/or the DT from the server 615 (e.g., via the network node 610 or without the involvement of the network node 610). The GCM and DT obtained by the UE 605 may be the same as the GCM and DT obtained by the network node 610.

In some aspects, the server 615 may update the GCM. For example, the server 615 may use uplink measurements (e.g., by the network node 610) to update the GCM. Additionally, or alternatively, the server 615 may generate the GCM, as described elsewhere herein.

As shown by reference number 630, the network node 610 may transmit, and the UE 605 may receive, a configuration of a downlink reference signal. For example, the downlink reference signal may include a CSI-RS. In some aspects, the configuration of the downlink reference signal may include a plurality of resource patterns for the downlink reference signal. A resource pattern may indicate a periodicity, a frequency domain resource, a frequency domain density, a frequency domain pattern, a number of symbols, a number of frequency domain resources, or the like, for the downlink reference signal. In some aspects, the network node 610 may transmit the configuration of the downlink reference signal via RRC signaling. In some aspects, the configuration of the downlink reference signal may be specific to a cell, such as a cell corresponding to (e.g., represented by) the DT. Additionally, or alternatively, the configuration of the downlink reference signal may be specific to a sub-cell, such as a sub-cell corresponding to (e.g., represented by) the DT. Additionally, or alternatively, the configuration of the downlink reference signal may be specific to the UE 605, as described below.

In some aspects, the configuration of the downlink reference signal may be based on the GCM and/or the DT. For example, the plurality of resource patterns may be derived from the GCM and the DT. More specifically, frequency-domain densities or numbers of CSI-RS resources of the plurality of resource patterns may be derived from a frequency selectivity indicated by the GCM and the DT. In some aspects, the configuration of the downlink reference signal may be specific to the UE 605 based on the GCM and/or the DT. For example, the network node 610 may use the GCM and/or the DT to identify two or more resource patterns suitable for the UE 605 (e.g., according to frequency selectivity specific to a transmission received by the UE 605, determined using the GCM and the DT), and may configure the two or more resource patterns for the UE 605.

In some aspects, the network node 610 may transmit, and the UE 605 may receive, an indication (e.g., via MAC signaling) for the UE 605 to perform channel estimation using the DT and the GCM. For example, the indication may indicate for the UE 605 to perform channel estimation using a GCM-based channel estimation algorithm. A GCM-based channel estimation algorithm may include a channel estimation algorithm that can receive, as input, channel information output by the GCM. Additionally, or alternatively, the indication may indicate for the UE 605 to generate an input to the channel estimation algorithm by combining the channel information output by the GCM with channel information obtained by measuring a downlink reference signal. Thus, the indication may indicate for the UE 605 to use one or more priors derived from the GCM for channel estimation.

In some aspects, the network node 610 may transmit, and the UE 605 may receive, an indication (e.g., via MAC signaling) for the UE 605 to compute or report a precoding indicator (e.g., a PMI) using the GCM and the DT. For example, the indication may indicate for the UE 605 to perform DT+GCM based precoder optimization. Precoder optimization may include selecting a precoding indicator using channel information output by the GCM. For example, the UE 605 may compute the precoding indicator using a propagation channel output by the GCM and the DT.

In some aspects, the network node 610 may transmit, and the UE 605 may receive, an indication (e.g., via MAC signaling) of a DMRS configuration, sometimes referred to as a DMRS pattern. For example, the DMRS configuration may indicate one or more parameters of a DMRS of a downlink communication, such as a frequency-domain density (e.g., a number of different DMRSs in a given bandwidth) or a number of layers (e.g., a number of data streams, which may correspond to the number of different DMRSs). In some aspects, the DMRS configuration may be based on the GCM and the DT. For example, the network node 610 may determine the frequency-domain density and/or the number of layers based on a frequency selectivity, wherein the frequency selectivity is derived from the channel estimation and/or the channel information output by the GCM and the DT. A higher frequency selectivity (indicating more channel variance over frequency at a given time) may lead to a smaller number of layers and/or a higher frequency-domain density of DMRSs, whereas a lower frequency selectivity (indicating less channel variance over frequency at a given time) may lead to a larger number of layers and/or a lower frequency-domain density of DMRSs. In one example, a channel having a higher frequency selectivity may lead to a DMRS configuration that supports two layers, thereby having DMRSs for a given layer occurring in every second sub-carrier, and a channel having a lower frequency selectivity may lead to a DMRS configuration that supports four layers, thereby having DMRSs for a given layer occurring in every fourth sub-carrier. In some aspects, the indication of the DMRS configuration may be specific to the UE 605. For example, the network node 610 may determine different DMRS configurations for different UEs using one or more GCMs and/or one or more DTs.

As shown by reference number 635, in some aspects, the network node 610 may transmit (e.g., via MAC signaling) an indication of a selected resource pattern of the plurality of resource patterns. The UE 605 may receive the indication of the selected resource pattern of the plurality of resource patterns. For example, the network node may select the resource pattern using the GCM and the DT. In some aspects, the network node may select the resource pattern based on the UE 605. For example, the network node may select the resource pattern based on a location of the UE 605 in the DT. More specifically, the network node 610 may determine a number of CSI-RS resources or instances (e.g., in a frequency domain) based on a frequency selectivity of channel realizations output by the GCM and the DT. In this example, the network node 610 may select a resource pattern with a higher number or density of CSI-RS resources or instances for a highly frequency-selective channel, and may select a resource pattern with a lower number or density of CSI-RS resources or instances for a less frequency-selective channel. Thus, the network node 610 may optimize CSI-RS patterns using the DT+GCM, and may signal this to the UE 605. In some aspects, the indication of the selected resource pattern may be specific to a cell. In some aspects, the indication of the selected resource pattern may be specific to a sub-cell. In some aspects, the indication of the selected resource pattern may be specific to a UE 605, as mentioned above.

As shown by reference number 640, the network node 610 may transmit, and the UE 605 may receive, the downlink reference signal. For example, the network node 610 may transmit the downlink reference signal in accordance with the configuration of the downlink reference signal and/or in accordance with a selected resource pattern of the configuration. In some aspects, the downlink reference signal may be un-precoded (e.g., transmitted without using a precoder or without beamforming). In some aspects, the downlink reference signal may be precoded.

As shown by reference number 645, the UE 605 may perform channel estimation using the configuration of the downlink reference signal. For example, the UE 605 may perform channel estimation using a channel estimation algorithm. In some aspects, the channel estimation algorithm may include a minimum mean squared error (MMSE) algorithm or another form of channel estimation algorithm. The UE 605 may perform the channel estimation using measurements on the downlink reference signal, as defined by the configuration. In some aspects, the UE 605 may perform channel estimation based on the GCM and the DT. For example, the UE 605 may use a channel estimation algorithm that receives, as input, the channel information output by the GCM. The channel estimation algorithm may additionally receive the measurements on the downlink reference signal. In some aspects, the UE 605 may generate or determine one or more CSI parameters using an output of the channel estimation algorithm. The one or more CSI parameters may include an RI, a CQI, an indication of one or more beams, or the like. In some aspects, if the channel estimation algorithm uses the channel information output by the GCM, the one or more CSI parameters may be referred to as being based on or derived from the GCM. Performing channel estimation may include generating the one or more CSI parameters.

Additionally, or alternatively, the UE 605 may compute a precoding indicator (e.g., a PMI) using the GCM. For example, the UE 605 may compute the precoding indicator using channel information (e.g., a propagation channel) output by the GCM and the DT. Thus, the UE 605 may perform DT+GCM aided CSI-RS channel estimation and precoder optimization. The precoding indicator may be used for DMRS or downlink communication transmission by the network node 610.

As shown by reference number 650, the UE 605 may transmit, and the network node 610 may receive, a report. For example, the UE 605 may transmit a CSI report including feedback regarding the downlink reference signal. The report may include the precoding indicator, as described above. Additionally, or alternatively, the report may include one or more other CSI parameters, such as an RI, a CQI, an indication of one or more beams, or the like. In some aspects, these one or more other CSI parameters may be based on the GCM and/or the DT. For example, the one or more other CSI parameters may be derived from the channel estimation, and the channel estimation algorithm may use the GCM and/or the DT. In some aspects, the UE 605 may transmit the report via higher-layer signaling. For example, the UE 605 may transmit the report in an aperiodic PUSCH transmission or an aperiodic PUCCH transmission.

As shown by reference number 655, the network node 610 may transmit, and the UE 605 may receive (e.g., decode, demodulate), a downlink communication. The downlink communication may use the DMRS configuration described above. For example, the downlink communication may include a DMRS (e.g., one or more DMRSs) that occupy particular resource elements of the downlink communication in accordance with a frequency-domain density and/or number of layers indicated by the DMRS configuration (which may be specific to the UE 605, as described above). As another example, DMRS ports of the DMRS may use precoding indicated by the precoding indicator reported by the UE 605. Thus, the network node 610 may transmit a DMRS that is based on the GCM and the DT, which improves optimization of the DMRS with regard to overhead and throughput. For example, the network node 610 may provide or configure a UE-specific DMRS pattern, which may be determined using the precoding indicator reported by the UE 605 and/or the GCM/DT.

As indicated above, FIG. 6 is provided as an example. Other examples may differ from what is described with regard to FIG. 6.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with DT and GCM aided reference signal optimization.

As shown in FIG. 7, in some aspects, process 700 may include receiving a GCM that outputs channel information pertaining to a DT (block 710). For example, the UE (e.g., using reception component 902 and/or communication manager 906, depicted in FIG. 9) may receive a GCM that outputs channel information pertaining to a DT, as described above.

As further shown in FIG. 7, in some aspects, process 700 may include receiving a configuration of a downlink reference signal (block 720). For example, the UE (e.g., using reception component 902 and/or communication manager 906, depicted in FIG. 9) may receive a configuration of a downlink reference signal, as described above.

As further shown in FIG. 7, in some aspects, process 700 may include generating one or more channel state information (CSI) parameters using a channel estimation algorithm, wherein the channel estimation algorithm uses the downlink reference signal (block 730). For example, the UE (e.g., using communication manager 906, depicted in FIG. 9) may perform channel estimation using the configuration of the downlink reference signal, as described above.

As further shown in FIG. 7, in some aspects, process 700 may include transmitting a report including the one or more CSI parameters and a precoding indicator, wherein at least one of computation of the precoding indicator, or the channel estimation algorithm, uses the GCM (block 740). For example, the UE (e.g., using transmission component 904 and/or communication manager 906, depicted in FIG. 9) may transmit a report, wherein the report includes a precoding indicator, and wherein at least one of computation of the precoding indicator, or a channel estimation algorithm for the channel estimation, uses the GCM, as described above.

Process 700 may include additional aspects, such as any single aspect or any combination of aspects described below and/or in connection with one or more other processes described elsewhere herein.

In a first aspect, process 700 includes receiving an indication that the channel estimation algorithm is to use the GCM.

In a second aspect, alone or in combination with the first aspect, performing the channel estimation algorithm further comprises performing the channel estimation algorithm using the GCM, wherein the channel estimation algorithm receives, as input, the channel information.

In a third aspect, alone or in combination with one or more of the first and second aspects, process 700 includes identifying the precoding indicator using the GCM, wherein identifying the precoding indicator uses an output of the channel estimation algorithm, and channeling information generated by the GCM.

In a fourth aspect, alone or in combination with one or more of the first through third aspects, the channel estimation algorithm uses the channel information.

In a fifth aspect, alone or in combination with one or more of the first through fourth aspects, the configuration of the downlink reference signal is associated with the GCM.

In a sixth aspect, alone or in combination with one or more of the first through fifth aspects, the configuration of the downlink reference signal has a frequency-domain density that is associated with a frequency selectivity of the channel estimation.

In a seventh aspect, alone or in combination with one or more of the first through sixth aspects, process 700 includes receiving a downlink transmission having a DMRS configuration, wherein the DMRS configuration is associated with the GCM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with GCM and DT aided reference signal optimization.

As shown in FIG. 8, in some aspects, process 800 may include receiving a GCM that outputs channel information pertaining to a DT (block 810). For example, the network node (e.g., using reception component 1002 and/or communication manager 1006, depicted in FIG. 10) may receive a GCM that outputs channel information pertaining to a DT, as described above.

As further shown in FIG. 8, in some aspects, process 800 may include transmitting a configuration of a downlink reference signal (block 820). For example, the network node (e.g., using transmission component 1004 and/or communication manager 1006, depicted in FIG. 10) may transmit a configuration of a downlink reference signal, as described above.

As further shown in FIG. 8, in some aspects, process 800 may include receiving a report associated with the configuration of the downlink reference signal (block 830). For example, the network node (e.g., using reception component 1002 and/or communication manager 1006, depicted in FIG. 10) may receive a report associated with the configuration of the downlink reference signal, as described above.

As further shown in FIG. 8, in some aspects, process 800 may include transmitting a downlink communication using a DMRS configuration, wherein at least one of the configuration of the downlink reference signal or the DMRS configuration is based on the GCM (block 840). For example, the network node (e.g., using transmission component 1004 and/or communication manager 1006, depicted in FIG. 10) may transmit a downlink communication using a DMRS configuration, wherein at least one of the configuration of the downlink reference signal or the DMRS configuration is based on the GCM, as described above.

Process 800 may include additional aspects, such as any single aspect or any combination of aspects described below and/or in connection with one or more other processes described elsewhere herein.

In a first aspect, the configuration of the downlink reference signal indicates a resource pattern for the downlink reference signal.

In a second aspect, alone or in combination with the first aspect, the resource pattern is associated with a frequency selectivity of the channel information output by the GCM.

In a third aspect, alone or in combination with one or more of the first and second aspects, the resource pattern is specific to one of a cell, a part of a cell, or a user equipment.

In a fourth aspect, alone or in combination with one or more of the first through third aspects, the cell or the part of the cell corresponds to the DT.

In a fifth aspect, alone or in combination with one or more of the first through fourth aspects, process 800 includes transmitting an indication of the GCM to a user equipment.

In a sixth aspect, alone or in combination with one or more of the first through fifth aspects, at least one of a frequency-domain density of the DMRS configuration or a number of layers associated with the DMRS configuration is associated with a frequency selectivity of the channel information output by the GCM.

In a seventh aspect, alone or in combination with one or more of the first through sixth aspects, process 800 includes providing an indication for a user equipment to perform channel estimation or precoding indicator computation using the GCM.

In an eighth aspect, alone or in combination with one or more of the first through seventh aspects, the configuration includes a plurality of resource patterns for the downlink reference signal, and the plurality of resource patterns are derived using the GCM.

In a ninth aspect, alone or in combination with one or more of the first through eighth aspects, process 800 includes transmitting an indication of a selected resource pattern of the plurality of resource patterns.

In a tenth aspect, alone or in combination with one or more of the first through ninth aspects, process 800 includes selecting the selected resource pattern using at least one of the channel information output by the GCM or the report received from a user equipment associated with the configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
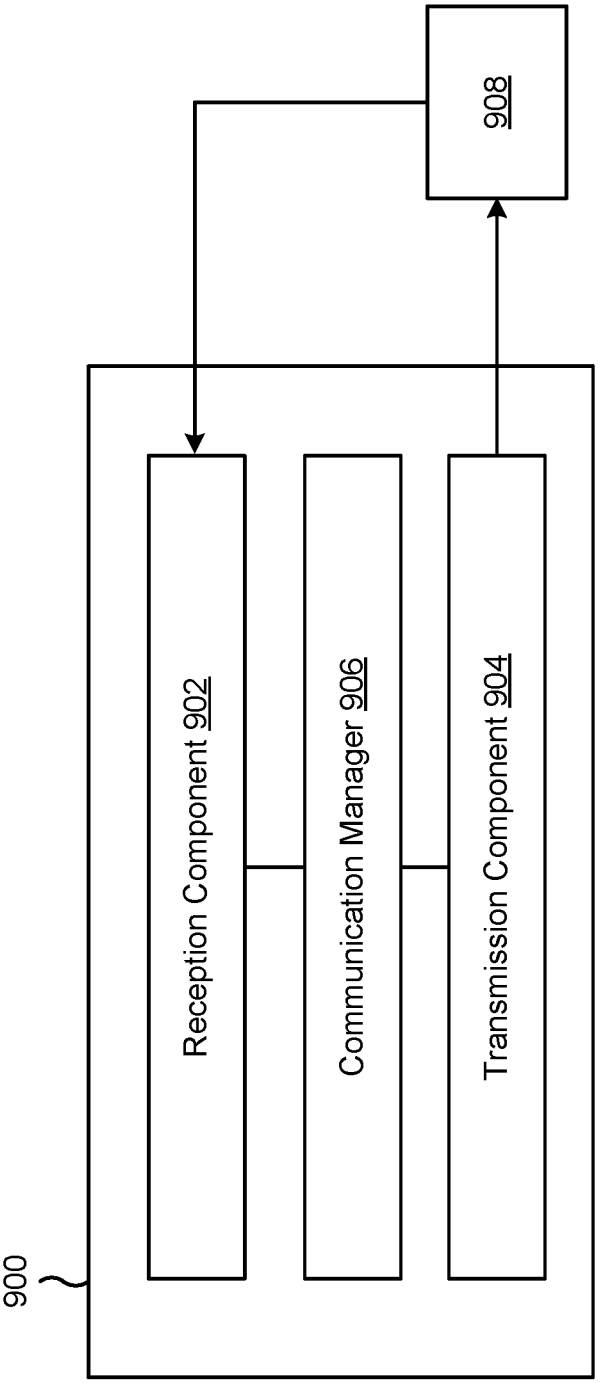
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

Figure 4:
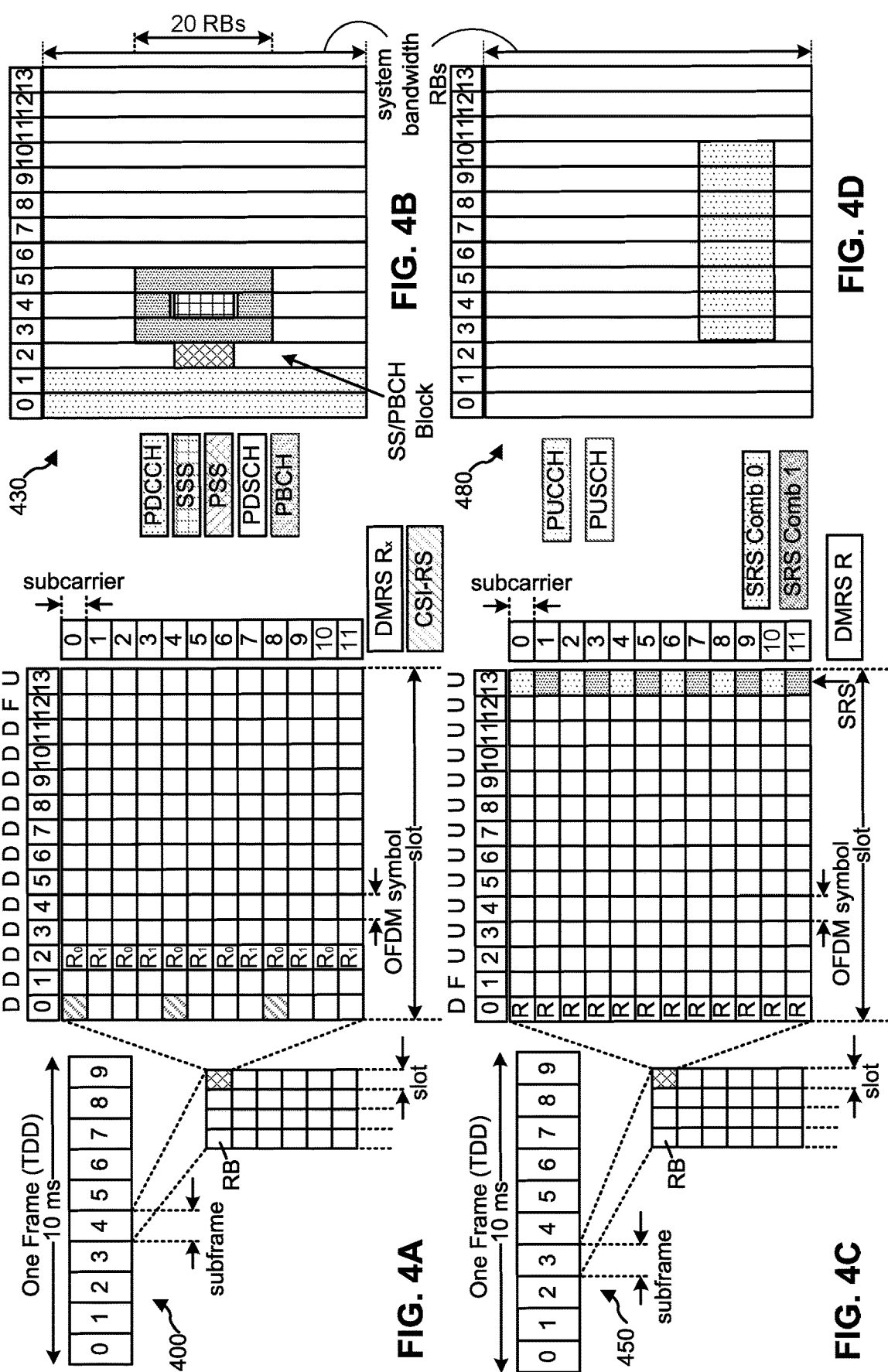
FIGS. 4A, 4B, 4C, and 4D depict aspects of data structures for a wireless communications network, in accordance with the present disclosure.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a GCM that outputs channel information pertaining to a digital twin (DT). The reception component 902 may receive a configuration of a downlink reference signal. The communication manager 906 may perform channel estimation using the configuration of the downlink reference signal. The transmission component 904 may transmit a report, wherein the report includes a precoding indicator, and wherein at least one of computation of the precoding indicator, or a channel estimation algorithm for the channel estimation, uses the GCM.

The reception component 902 may receive an indication that the channel estimation algorithm is to use the GCM.

The communication manager 906 may identify the precoding indicator using the GCM, wherein identifying the precoding indicator uses an output of the channel estimation algorithm, and channel information generated by the GCM.

The reception component 902 may receive a downlink transmission having a DMRS configuration, wherein the DMRS configuration is associated with the GCM.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
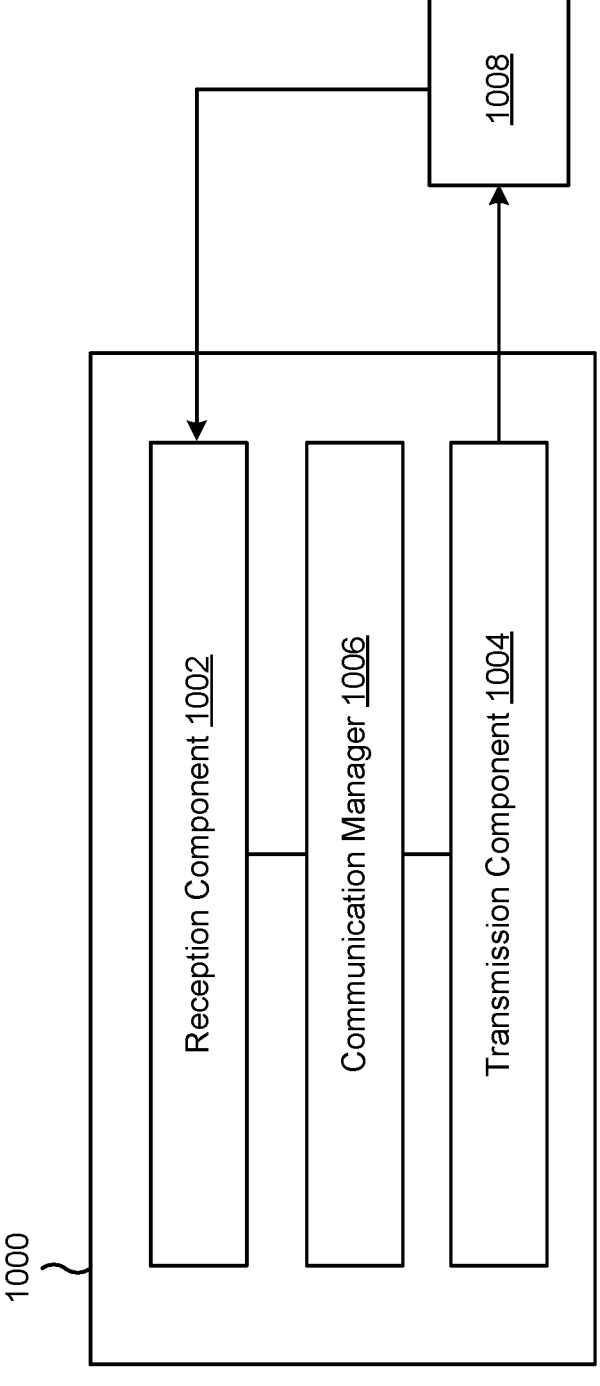
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception The reception component 1002 may receive a GCM that outputs channel information pertaining to a DT. The transmission component 1004 may transmit a configuration of a downlink reference signal. The reception component 1002 may receive a report associated with the configuration of the downlink reference signal. The transmission component 1004 may transmit a downlink communication using a DMRS configuration, wherein at least one of the configuration of the downlink reference signal or the DMRS configuration is based on the GCM.

The transmission component 1004 may transmit an indication of the GCM to a user equipment.

The communication manager 1006 may provide an indication for a user equipment to perform channel estimation or precoding indicator computation using the GCM.

The transmission component 1004 may transmit an indication of a selected resource pattern of the plurality of resource patterns.

The communication manager 1006 may select the selected resource pattern using at least one of the channel information output by the GCM or the report received from a user equipment associated with the configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a generative channel model (GCM) that outputs channel information pertaining to a digital twin (DT); receiving a configuration of a downlink reference signal; generating one or more channel state information (CSI) parameters using a channel estimation algorithm, wherein the channel estimation algorithm uses the downlink reference signal; and transmitting a report including the one or more CSI parameters and a precoding indicator, wherein at least one of computation of the precoding indicator, or a channel estimation algorithm for the channel estimation, uses the GCM.

Aspect 2: The method of Aspect 1, further comprising receiving an indication to use a GCM-based channel estimation algorithm as the channel estimation algorithm.

Aspect 3: The method of Aspect 2, wherein the channel estimation algorithm receives, as input, the channel information.

Aspect 4: The method of any of Aspects 1-3, further comprising computing the precoding indicator using the GCM, wherein computing the precoding indicator uses: an output of the channel estimation algorithm, and channel information generated by the GCM.

Aspect 5: The method of Aspect 4, wherein the channel estimation algorithm uses the channel information.

Aspect 6: The method of any of Aspects 1-5, wherein the configuration of the downlink reference signal is associated with the GCM.

Aspect 7: The method of Aspect 6, wherein the configuration of the downlink reference signal has a frequency-domain density that is associated with a frequency selectivity of the channel estimation algorithm.

Aspect 8: The method of any of Aspects 1-7, further comprising receiving a downlink transmission having a demodulation reference signal (DMRS) configuration, wherein the DMRS configuration is associated with the GCM.

Aspect 9: A method of wireless communication performed by a network node, comprising: receiving a generative channel model (GCM) that outputs channel information pertaining to a digital twin (DT); transmitting a configuration of a downlink reference signal; receiving a report associated with the configuration of the downlink reference signal; and transmitting a downlink communication using a DMRS configuration, wherein at least one of the configuration of the downlink reference signal or the DMRS configuration is based on the GCM.

Aspect 10: The method of Aspect 9, wherein the configuration of the downlink reference signal indicates a resource pattern for the downlink reference signal.

Aspect 11: The method of Aspect 10, wherein the resource pattern is associated with a frequency selectivity of the channel information output by the GCM.

Aspect 12: The method of Aspect 10, wherein the resource pattern is specific to one of: a cell, a part of a cell, or a user equipment.

Aspect 13: The method of Aspect 12, wherein the cell or the part of the cell corresponds to the DT.

Aspect 14: The method of any of Aspects 9-13, further comprising transmitting an indication of the GCM to a user equipment.

Aspect 15: The method of any of Aspects 9-14, wherein at least one of a frequency-domain density of the DMRS configuration or a number of layers associated with the DMRS configuration is associated with a frequency selectivity of the channel information output by the GCM.

Aspect 16: The method of any of Aspects 9-15, further comprising providing an indication for a user equipment to perform channel estimation or precoding indicator computation using the GCM.

Aspect 17: The method of any of Aspects 9-16, wherein the configuration includes a plurality of resource patterns for the downlink reference signal, and wherein the plurality of resource patterns are derived using the GCM.

Aspect 18: The method of Aspect 17, further comprising transmitting an indication of a selected resource pattern of the plurality of resource patterns.

Aspect 19: The method of Aspect 18, further comprising selecting the selected resource pattern using at least one of the channel information output by the GCM or the report received from a user equipment associated with the configuration.

Aspect 20: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-19.

Aspect 21: An apparatus for wireless communication at a device, the apparatus comprising one or more memories and one or more processors coupled to the one or more memories, the one or more processors configured to cause the device to perform the method of one or more of Aspects 1-19.

Aspect 22: An apparatus for wireless communication, the apparatus comprising at least one means for performing the method of one or more of Aspects 1-19.

Aspect 23: A non-transitory computer-readable medium storing code for wireless communication, the code comprising instructions executable by one or more processors to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

Aspect 25: A device for wireless communication, the device comprising a processing system that includes one or more processors and one or more memories coupled with the one or more processors, the processing system configured to cause the device to perform the method of one or more of Aspects 1-19.

Aspect 26: An apparatus for wireless communication at a device, the apparatus comprising one or more memories and one or more processors coupled to the one or more memories, the one or more processors individually or collectively configured to cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to cause the UE to:
        receive, from a network node, an indication of a generative channel model (GCM) that outputs channel information pertaining to a digital twin (DT);
        receive, from a server, the GCM and the DT;
        receive a configuration of a downlink reference signal;
        perform, based at least in part on the GCM and the DT, channel estimation using the configuration of the downlink reference signal; and
        transmit a report including one or more channel state information (CSI) parameters, generated based on the channel estimation, and a precoding indicator, wherein computation of the precoding indicator uses the GCM and the DT.

2. The apparatus of claim 1, wherein the one or more processors are further configured to cause the UE to receive an indication to use a GCM-based channel estimation algorithm to perform the channel estimation.

3. The apparatus of claim 2, wherein the GCM-based channel estimation algorithm receives, as input, the channel information.

4. The apparatus of claim 1, wherein the one or more processors are further configured to cause the UE to compute the precoding indicator using the GCM and the DT, wherein the computation of the precoding indicator uses:
    an output of a channel estimation algorithm, and
    the channel information.

5. The apparatus of claim 4, wherein the channel estimation algorithm uses the channel information.

6. The apparatus of claim 1, wherein the configuration of the downlink reference signal is associated with the GCM.

7. The apparatus of claim 6, wherein the configuration of the downlink reference signal has a frequency-domain density that is associated with a frequency selectivity of a channel estimation algorithm.

8. The apparatus of claim 1, wherein the one or more processors are further configured to cause the UE to receive a downlink transmission having a demodulation reference signal (DMRS) configuration, wherein the DMRS configuration is associated with the GCM.

9. The apparatus of claim 1, wherein the one or more processors are further configured to cause the UE to receive an indication of a selected resource pattern based on a location of the UE in the DT.

10. An apparatus for wireless communication at a network node, comprising:
    one or more memories; and
    one or more processors, coupled to the one or more memories, configured to cause the network node to:
        transmit, to a user equipment (UE), an indication of a generative channel model (GCM) that outputs channel information pertaining to a digital twin (DT);
        receive, from a server, the GCM and the DT;
        transmit a configuration of a downlink reference signal;
        receive a report associated with the configuration of the downlink reference signal, wherein the report includes one or more channel state information (CSI) parameters based on the GCM and the DT; and
        transmit a downlink communication using a demodulation reference signal (DMRS) configuration, wherein at least one of the configuration of the downlink reference signal or the DMRS configuration is based on the GCM and the DT.

11. The apparatus of claim 10, wherein the configuration of the downlink reference signal indicates a resource pattern for the downlink reference signal.

12. The apparatus of claim 11, wherein the resource pattern is associated with a frequency selectivity of the channel information output by the GCM.

13. The apparatus of claim 11, wherein the resource pattern is specific to one of:
   a cell,
   a part of a cell, or
   the UE.

14. The apparatus of claim 13, wherein the cell or the part of the cell corresponds to the DT.

15. The apparatus of claim 10, wherein at least one of a frequency-domain density of the DMRS configuration or a number of layers associated with the DMRS configuration is associated with a frequency selectivity of the channel information output by the GCM.

16. The apparatus of claim 10, wherein the one or more processors are further configured to cause the network node to provide an indication for the UE to perform channel estimation or precoding indicator computation using the GCM.

17. The apparatus of claim 10, wherein the configuration includes a plurality of resource patterns for the downlink reference signal, and wherein the plurality of resource patterns are derived using the GCM.

18. The apparatus of claim 17, wherein the one or more processors are further configured to cause the network node to transmit an indication of a selected resource pattern of the plurality of resource patterns.

19. The apparatus of claim 18, wherein the one or more processors are further configured to cause the network node to select the selected resource pattern using at least one of the channel information output by the GCM or the report.

20. A method of wireless communication performed by a user equipment (UE), comprising:
   receiving, from a network node, an indication of a generative channel model (GCM) that outputs channel information pertaining to a digital twin (DT);
   receiving, from a server, the GCM and the DT;
   receiving a configuration of a downlink reference signal;
   performing, based at least in part on the GCM and the DT, channel estimation using the configuration of the downlink reference signal; and
   transmitting a report including one or more channel state information (CSI) parameters, generated based on the channel estimation, and a precoding indicator, wherein computation of the precoding indicator uses the GCM and the DT.

21. The method of claim 20, further comprising receiving an indication to use a GCM-based channel estimation algorithm to perform the channel estimation.

22. The method of claim 21, wherein the GCM-based channel estimation algorithm receives, as input, the channel information.

23. The method of claim 20, further comprising computing the precoding indicator using the GCM and the DT, wherein the computation of the precoding indicator uses:
   an output of a channel estimation algorithm, and
   the channel information.

24. The method of claim 23, wherein the channel estimation algorithm uses the channel information.

25. The method of claim 20, wherein the configuration of the downlink reference signal is associated with the GCM.

26. The method of claim 25, wherein the configuration of the downlink reference signal has a frequency-domain density that is associated with a frequency selectivity of a channel estimation algorithm.

27. The method of claim 20, further comprising receiving a downlink transmission having a demodulation reference signal (DMRS) configuration, wherein the DMRS configuration is associated with the GCM.

28. A method of wireless communication performed by a network node, comprising:
   transmitting, to a user equipment (UE), an indication of a generative channel model (GCM) that outputs channel information pertaining to a digital twin (DT);
   receiving, from a server, the GCM and the DT;
   transmitting a configuration of a downlink reference signal;
   receiving a report associated with the configuration of the downlink reference signal, wherein the report includes one or more channel state information (CSI) parameters based on the GCM and the DT; and
   transmitting a downlink communication using a demodulation reference signal (DMRS) configuration, wherein at least one of the configuration of the downlink reference signal or the DMRS configuration is based on the GCM and the DT.

29. The method of claim 28, wherein the configuration of the downlink reference signal indicates a resource pattern for the downlink reference signal.

30. The method of claim 29, wherein the resource pattern is associated with a frequency selectivity of the channel information output by the GCM.

* * * * *